(12) United States Patent
McGrath

(10) Patent No.: US 8,069,118 B2
(45) Date of Patent: Nov. 29, 2011

(54) MEDIATED ELECTRONIC MESSAGING WITH VALUE-ADDED SERVICES

(75) Inventor: Michael McGrath, Greensboro, NC (US)

(73) Assignee: United States Postal Service, Washington, DC (US)

( * ) Notice: Subject to any disclaimer, the term of this patent is extended or adjusted under 35 U.S.C. 154(b) by 1746 days.

(21) Appl. No.: 10/362,874

(22) PCT Filed: Sep. 7, 2001

(86) PCT No.: PCT/US01/27687
§ 371 (c)(1),
(2), (4) Date: Feb. 27, 2003

(87) PCT Pub. No.: WO02/21397
PCT Pub. Date: Mar. 14, 2002

(65) Prior Publication Data
US 2003/0208371 A1    Nov. 6, 2003

Related U.S. Application Data

(60) Provisional application No. 60/231,293, filed on Sep. 8, 2000.

(51) Int. Cl.
*G06F 21/00* (2006.01)
(52) U.S. Cl. ............... 705/59; 705/64; 705/67; 705/80

(58) Field of Classification Search .................... 705/59, 705/64, 67, 80
See application file for complete search history.

(56) References Cited

U.S. PATENT DOCUMENTS

| | | | |
|---|---|---|---|
| 5,649,117 A | 7/1997 | Landry | |
| 5,956,700 A | 9/1999 | Landry | |
| 6,957,199 B1* | 10/2005 | Fisher | 705/78 |
| 7,382,482 B2* | 6/2008 | Silverbrook et al. | 358/1.15 |
| 2002/0038293 A1* | 3/2002 | Seiden | 705/80 |
| 2006/0069574 A1* | 3/2006 | Ok | 705/1 |

OTHER PUBLICATIONS

PCT International Search Report for PCT/US01/27687, mailed Jan. 2, 2002.

* cited by examiner

*Primary Examiner* — Pierre E Elisca
(74) *Attorney, Agent, or Firm* — Lewis and Roca LLP

(57) ABSTRACT

A method for processing a value-added electronic transmission, which includes obtaining user identification information (110), conveying software (120) to the user, where the software enables the user to selectively send electronic transmissions to intended recipients via a mediation site, and associating with the mediation site at least one value-added processing service, including carrier indication, sender indication, transmission identification, guaranteed delivery, address verification, address correction, archiving, and transmission security. The method further includes billing the user (140) for service rendered through the mediation site.

69 Claims, 13 Drawing Sheets

Recipient's - Mailbox

File  Edit  View  Actions  Tools  Window  Help

| Mail | AddrBook | Save | Delete | Print | Details | Archive | Threads |
|------|----------|------|--------|-------|---------|---------|---------|

MY MAILBOX

Inbox

| FROM | | Subject | Date |
|------|---|---------|------|
| 📄 | Anna Slaw | Interview | 08/22/00 08:30a |
| 📄 | John Khan | Re: New Color Printer | 08/22/00 09:15a |
| 📄 | Jack Harris | Training | 08/22/00 10:00a |
| 📄 | Mike Johns | Pilot | 08/22/00 10:30a |
| 📎 | Richard Rains | Gentle Reminder ... | 08/22/00 10:45a |
| 📄 | Michelle Hale | Question? | 08/22/00 11:15a |
| 📄 | Brenda Hank | Re: Pictures | 08/22/00 11:35a |
| 📎 | Carolyn Willis | Sharing | 08/22/00 Noon |
| 📄 | Tracy Houston | Word 2 | 08/22/00 12:10p |
| 📄 | Linda Panns | New Client | 08/22/00 12:23p |
| 📄 | Kim Clark | Re: Ready | 08/22/00 01:30p |
| 📎 | Don Kibs | Front-page Installed | 08/22/00 02:42p |
| 📄 | Eric Little | Time Entered | 08/22/00 03:39p |
| 📄 | Brian John | Translation | 08/22/00 04:15p |
| 📎 | Kim Chung | ART SHOW | 08/22/00 04:30p |
| 📄 | Michiel Hall | Question | 08/22/00 05:00p |
| 📄 | Javier Austin | Check | 08/22/00 05:20p |
| 📄 | Scott Lank | 08/23 | 08/22/00 06:30p |

FIGURE 5

Recipient's - Mailbox

File  Edit  View  Actions  Tools  Window  Help

| Mail | AddrBook | Save | Delete | Print | Details | Archive | Threads |
|------|----------|------|--------|-------|---------|---------|---------|

MY MAILBOX

Inbox

| FROM | Subject | Date |
|------|---------|------|
| Anna Slaw | Interview | 08/22/00 08:30a |
| John Khan | Re: New Color Printer | 08/22/00 09:15a |
| Jack Harris | Training | 08/22/00 10:00a |
| Mike Johns | Pilot | 08/22/00 10:30a |
| Richard Rains | Gentle Reminder … | 08/22/00 10:45a |
| Michelle Hale | Question? | 08/22/00 11:15a |
| Brenda Hank | Re: Pictures | 08/22/00 11:35a |
| Carolyn Willis | Sharing | 08/22/00 Noon |
| Tracy Houston | Word 2 | 08/22/00 12:10p |
| Linda Panns | New Client | 08/22/00 12:23p |
| Kim Clark | Re: Ready | 08/22/00 01:30p |
| Don Kibs | Front-page Installed | 08/22/00 02:42p |
| Eric Little | Time Entered | 08/22/00 03:39p |
| Brian John | Translation | 08/22/00 04:15p |
| Kim Chung | ART SHOW | 08/22/00 04:30p |
| Michiel Hall | Question | 08/22/00 05:00p |
| Javier Austin | Check | 08/22/00 05:20p |
| Scott Lank | 08/23 | 08/22/00 06:30p |

FIGURE 7

MEDIATED ELECTRONIC MESSAGING WITH VALUE-ADDED SERVICES

RELATED APPLICATIONS

This application claims the benefit of a provisional application entitled "Mediated Electronic Messaging with Value-Added Services," filed Sep. 8, 2000 and assigned Ser. No. 60/231,293. The contents of the above application is relied upon and expressly incorporated herein by reference.

DESCRIPTION OF THE INVENTION

1. Field of the Invention

The present invention relates generally to a mediated electronic transmission system that allows a user to obtain value-added processing of electronic transmissions.

2. Background of the Invention

The use of electronic networks to convey information among networked users has undergone an enormous amount of growth in recent years. The ability to transfer data using computer applications, such as, for example, electronic mail ("e-mail") and file transfer protocol ("FTP") programs, has become increasingly important in personal, and especially, business communications. Electronic communication services have become invaluable to individual and business concerns.

E-mail is a well-known means of communication for individuals and businesses with access to computers and Internet connections. When a user establishes an account with an e-mail service provider, e.g., America Online™ or Hotmail™, the user is assigned a unique e-mail address, e.g., someone@inter.net. Another individual can send a message to the user by entering the user's e-mail address along with the message and sending it via the Internet. E-mail can provide almost instant message delivery among individuals and businesses over vast distances for very little or no cost.

Despite the advantages of e-mail, there are drawbacks. E-mail messages are insecure, and can be intercepted en route by unknown third parties. Individuals and businesses that communicate electronically need to know that the message was received, the message was secure during transit, and the recipient was correctly identified.

FTP allows a user to transfer files between two computers, generally connected via a network. If a system has FTP and is connected to a network, a user can access files available on connected computer systems. FTP allows for the easy transfer of large numbers of files, for instant access to files, and file sharing by many individuals over vast distances, a vast readily accessible network of files.

Despite the advantages of FTP, there are drawbacks. It may be difficult to keep files to be transferred secure and to control the flow of the electronic files. Individuals and businesses that use FTP for file sharing need to know that the files are kept private and that they can correctly identify the requester and source of the file.

In addition to e-mail and FTP programs, other types of data transfer are employed in business communications. For example, buying and selling goods online, electronic funds transfer, online advertising, and accessing business information resources, is known as electronic commerce (E-commerce). E-commerce can improve the efficiency of current business processes and provide opportunities to widen existing customer bases. As the number of Internet users continues to expand, E-commerce has the potential to be the source of an extraordinary amount of revenue growth. In order to realize this potential, a variety of communication services and features will be required for E-commerce, which traditionally have been available in physical communication channels.

The United States Postal Service (USPS), an independent establishment of the executive branch of the U.S. Government provides many E-commerce features through a variety of document and package delivery services. The USPS is widely recognized as a secure and reliable means for sending and receiving packages and physical mail used for both personal and business transactions. Customers have come to rely upon the accuracy and authenticity of time-stamped and official postmarks contained on physical USPS carried mail and parcels. However a similar level of reliance may not exist for typical electronic communication.

To ensure the vitality and growth of electronic communication and E-commerce, there would appear to be a need for new mechanisms for ensuring authenticity of electronic transmissions.

SUMMARY OF THE INVENTION

In accordance with the invention, as embodied and broadly described herein, the invention provides apparatus and methods for value-added processing of electronic transmission.

An embodiment of the invention provides a method for processing an electronic transmission, which includes obtaining user identification information, conveying software to the user, where the software enables the user to selectively send electronic transmissions to intended recipients via a mediation site, and associating with the mediation site at least one value-added processing service, such as carrier indication, sender indication, transmission identification, guaranteed delivery, address verification, address correction, archiving, and transmission security. The method also includes billing the user for service rendered through the mediation site.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

FIG. 5 is an illustration of the display of the indicator in the recipient's electronic mailbox.

FIG. 7 is an illustration of the display of a sender's indicator in recipient's electronic mailbox.

DESCRIPTION OF THE EMBODIMENTS

Reference will now be made in detail to the present exemplary embodiments of the invention, examples of which are illustrated in the accompanying drawings. Wherever possible, the same reference numbers will be used throughout the drawings to refer to the same or like parts.

Certain aspects of the invention may relate to mediated electronic transmission. These include sending transmissions though an intermediary, such as a mediation site, to perform one or more value-added processing services. By way of example only, an e-mail transmitted in accordance with the invention may have a certification attached to it by a mediator before the e-mail is then transmitted by the mediator to the intended recipient. The certification may, for example, attest to the authenticity of the e-mail. Other examples are set forth in the following description.

As embodied herein, the invention may include an electronic transmission method. Specifically, electronic transmission may include any type of transmission of data over a network, such as e-mail or FTP.

Figure 1:
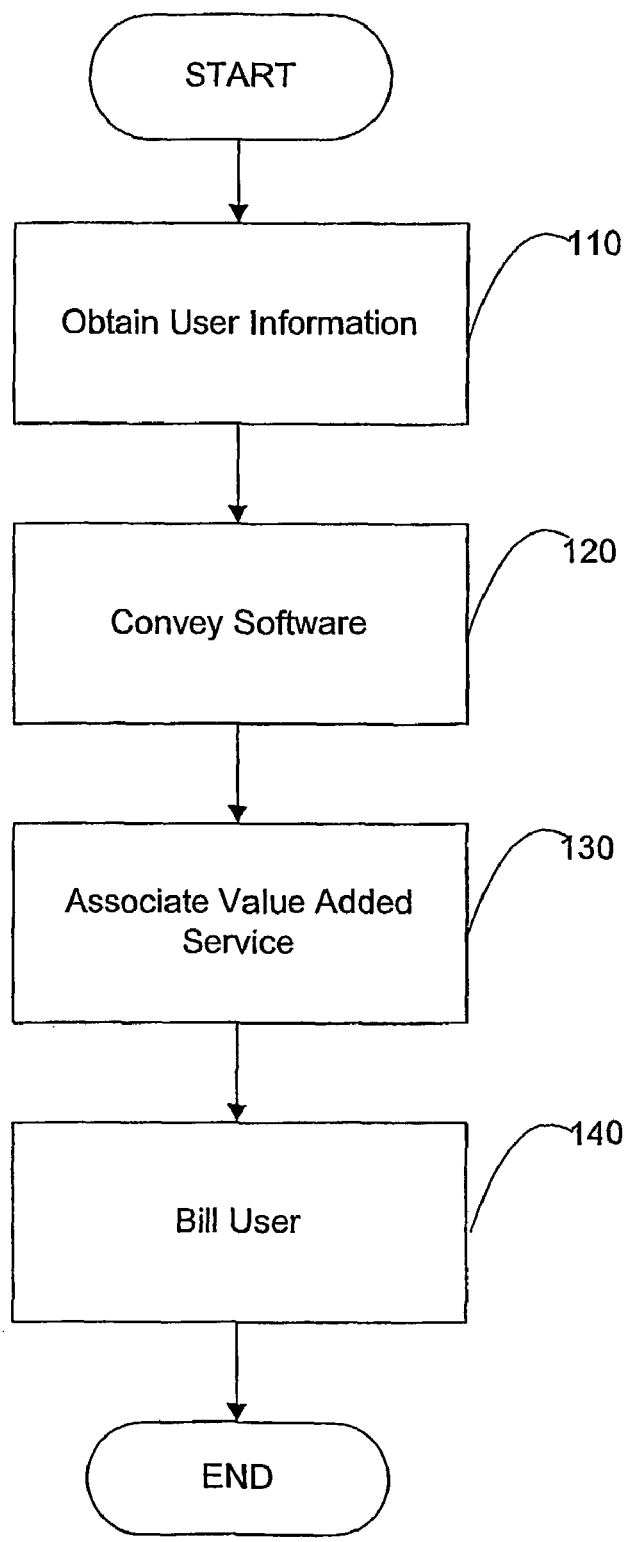
FIG. 1 is a flow diagram of one embodiment the function of the mediation site.

To expedite description of the invention, many of the examples herein refer to e-mail, e-mail messages, or messages. However these examples are for exemplary purposes only and not intended to limit the invention as claimed. In accordance with the invention a method includes obtaining user information. As embodied herein and illustrated in FIG. 1, an example of obtaining user information is schematically depicted as step 110. The user may be an individual or entity that wishes to use a mediation site to enhance electronic transmissions.

The identification information may include name, telephone number, an alternate identifier, and/or some type of a payment mechanism such as an account authorization or credit card number. This information may be stored in an account record. The account record may be an electronic file on the individual stored at a mediation site or may be stored at some other location or with a third party. The account record may be created when the user first inputs identification information. This input may take place during a registration process. The registration process may take place either at the mediation site, via a registration server, or at a third party site. In one embodiment the registration server may work on an NT 4.0 operating system. In another embodiment, the registration server may function on a mainframe.

In accordance with the invention a method includes conveying software to the user. As embodied herein and illustrated in FIG. 1, an example of software conveyed to the user is schematically depicted as step 120. The software may enable the user to take advantage of the services of the mediation site, by allowing the user to electronically transmit messages through the mediation site. The software may be a plug-in to the user's e-mail program. One embodiment of the plug-in may be an Outlook 2000 plug-in. Other embodiments may include a plug-in that is specifically tailored to an e-mail program, such as GroupWise, Eudora, Pegasus Mail, or Netscape Mail. Once installed, the plug-in can integrate into the user's e-mail program. The software may be conveyed to the customer electronically such as over the Internet, or it may be physically conveyed in other forms, such as CD, diskette, or some other physical media. The software may be conveyed to the user from the mediation site or it may be conveyed from another, third party site.

In accordance with the invention a method includes a mediation site for providing value-added services to an electronic transmission. As embodied herein and illustrated in FIG. 1, an example of a mediation site for providing value-added services to an electronic transmission is schematically depicted as step 130. The mediation site may be a server, or a type of network software, which allows for the association of value-added services to an electronic transmission. The mediation site, or mediator, allows for at least one type of value-added processing service, including carrier indication, sender indication, transmission identification, guaranteed delivery, address verification, address correction, archiving, or transmission security.

In accordance with the invention a method includes billing for the service rendered through the mediation site. As embodied herein and illustrated in FIG. 1, an example of billing for the service rendered through the mediation site is schematically depicted as step 140. Billing will allow for the receipt of payment for the services added by the mediation site. The billing may include a variety of methods, including prepaid, subscription or hierarchical or tiered billing structures. One embodiment of the invention may use a prepaid model. While service might be provided on a transaction by transaction basis, the value-added services may also be sold in blocks. The user might pay for a block of value-added services using a credit card, or may pay on a subscription basis. The subscription basis can provide a user access to the service on a monthly, bimonthly, semiannual, or annual basis after payment of a fixed fee for a either unlimited service or a tiered approach. A user may pay a fixed amount of money for a thousand services and then anything over the thousand services can be charged on another basis, such as on a per hundred or a tiered approach. Alternatively, some services might be offered free of charge in order to entice users to purchases other services.

Figure 2:
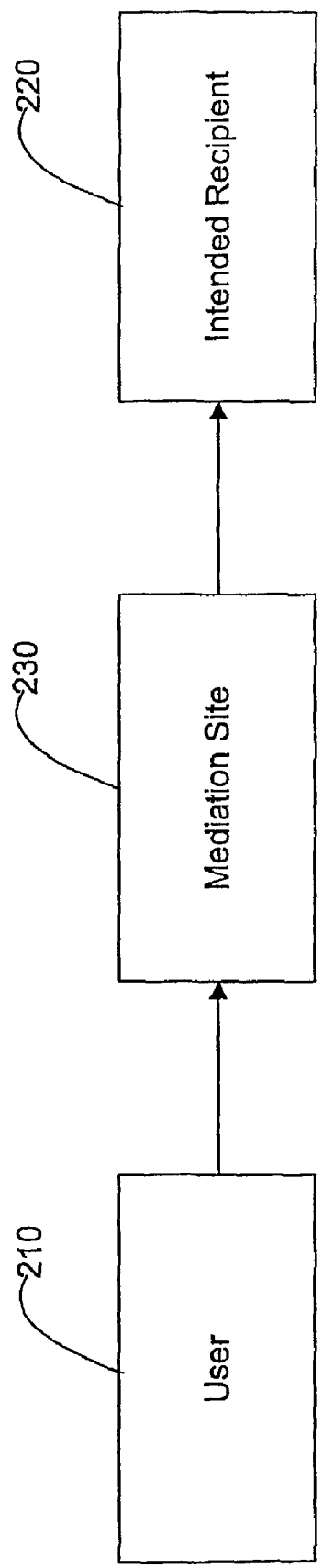
FIG. 2 is a block diagram of one embodiment of the act of mediated electronic transmission.

FIG. 2 is a block diagram of one embodiment of how the mediation site can function. User 210 can send a transmission through mediation site 230, where the transmission can be processed depending on service selected. Mediation site 230 conveys the value-added transmission to intended recipient 220. As illustrated in FIG. 2, user 210, intended recipient 220, and mediation site 230, each of which may be a workstation, personal computer, a Personal Digital Assistant (PDA), or any networkable device, are able to communicate over a network, which can be TCP/IP based, wireless, or any kind of digital network connection.

Figure 3:
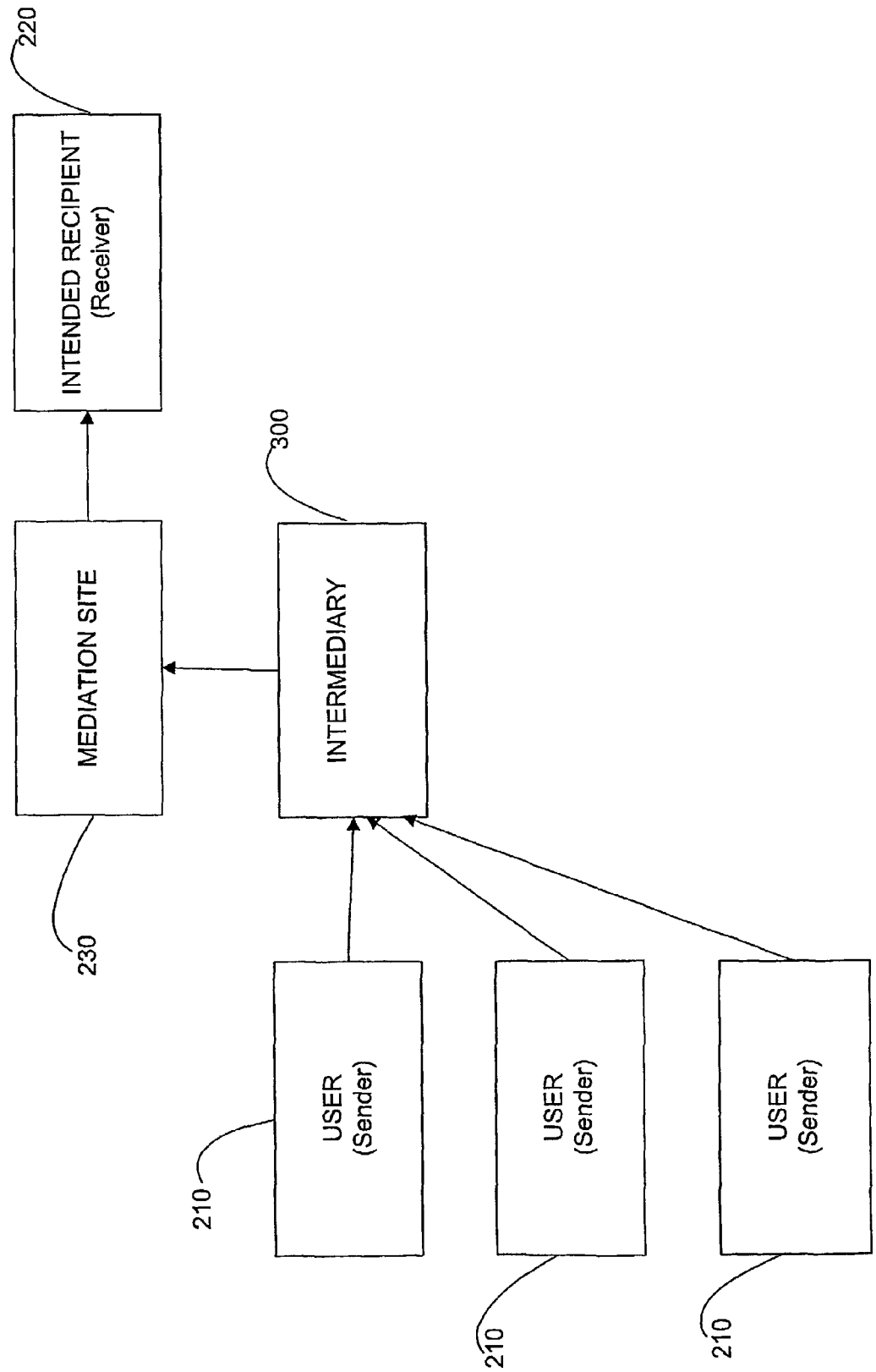
FIG. 3 is a block diagram of yet another embodiment of the act of mediated electronic transmission.

FIG. 3 is a block diagram of yet another embodiment of how the electronic transmission can function. User 210, which may be a sender, can send a message, such as a transmission, to an intermediary 300. Intermediary 300 can also receive a message from another user 210. Intermediary 300 may then send the message to mediation site 230. After processing at mediation site 230, mediation site 230 may send the message to receiver 220. Each time that there is a request for a service, there may be an intermediate step between the user and the mediation site. Thus, mediation, in its broadest sense, includes a process where one or more third parties other than the sender and recipient act as a go-between to add value to the transmission by providing one or more value-added services such as those described herein.

Carrier Indication

Figure 4:
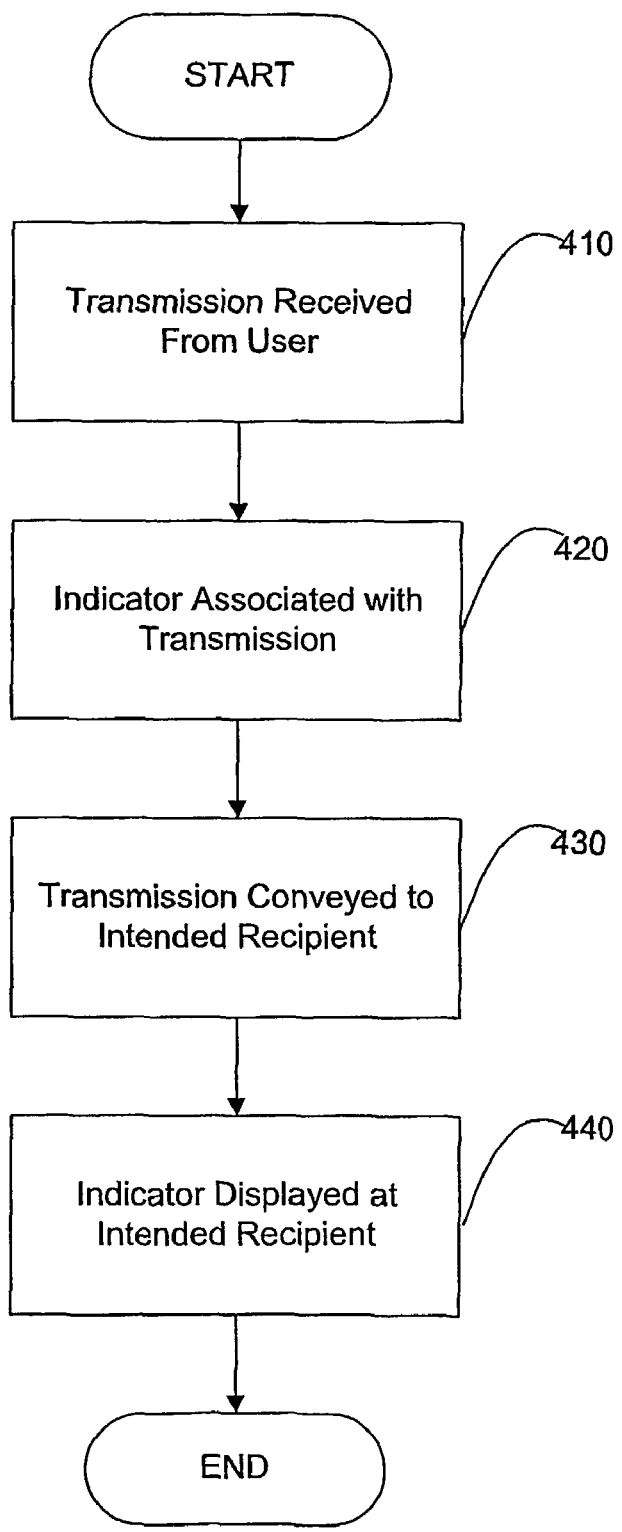
FIG. 4 a flow diagram of one embodiment of carrier indication.

In accordance with the invention there may be further provided the value-added processing service of carrier indication. As illustrated by example in FIG. 4, carrier indication involves accepting, at the mediation site, an electronic transmission from the user to the intended recipient (step 410). An indicator may be associated with the electronic transmission (step 420). The indicator can be a graphic, icon, or representation of the carrier or mediation site. The indicator may be used to indicate that the transmission was conveyed through the mediation site. The association may take place by attaching the indicator to the transmission. In another alternative, code may be attached to the transmission. The code, such as computer macro, may be read by the intended recipient's e-mail program, causing the recipient's e-mail program to display the indicator. Once the indicator is associated with the transmission, the transmission is conveyed to the intended recipient (step 430). After receipt by the intended recipient, the indicator associated with the electronic transmission may be displayed (step 440). The display may be adjacent to the electronic transmission identification information associated with the transmission.

FIG. 5 is an illustration of the display of the indicator in an electronic mailbox. From the recipient's perspective, each piece of "value-added" mail might be accompanied by a visual indicator of the mediator's, carrier's, or authenticator's identity. For the "value-added mail," the standard e-mail icon adjacent each new piece of e-mail in the recipient's mailbox may be replaced with an identifier such as the "beak in the box" as seen in FIG. 5.

Sender Indication

Figure 6:
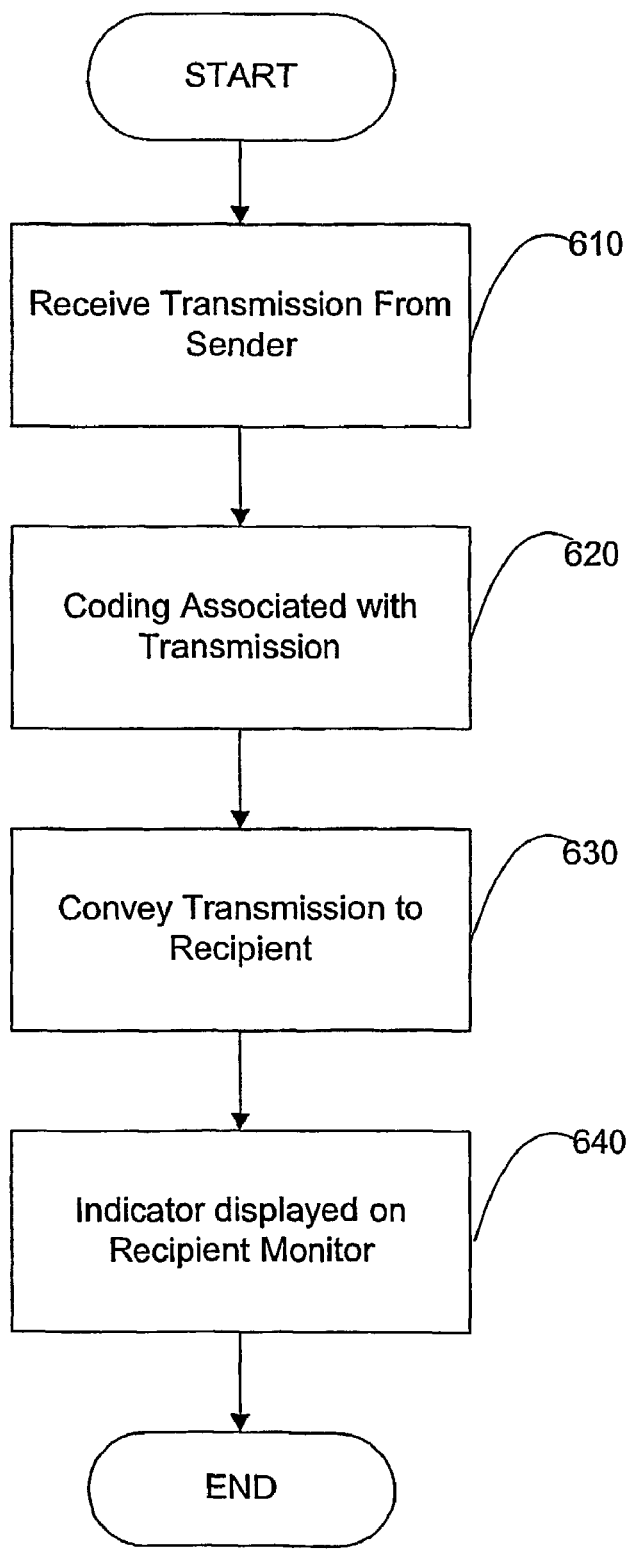
FIG. 6 a flow diagram of one embodiment of sender indication.

In accordance with the invention there may be further provided the value-added processing service of sender indication. As illustrated by example in FIG. 6, sender indication may involve accepting, at mediation site, an electronic transmission from the user to the intended recipient (step 610). The mediation site may convey the electronic transmission from the mediation site to the intended recipient (step 620). Associated with the transmission may be coding for an indicator reflective of the sender's identity (step 630). The electronic transmission and the indicator may be conveyed in a manner to cause the monitor of the intended recipient to display the indicator, in association with electronic transmission identification information (step 640). The electronic transmission identification information may be a list of details commonly associated with a transmission, including sender name, subject, and date. The identification information may be placed in a list, such as the list of new mail found in an e-mail program mailbox. The mailbox may be an inbox or any type of file where e-mail messages are listed.

FIG. 7 is an illustration of the display of a sender's indicator in an electronic mailbox. From the recipient's perspective, each piece of "value-added" mail might be accompanied by a visual indicator of the sender's identity. The sender may have an indicator, which may be associated with the message. Both the carrier and sender's indicator, or just one of them, may be displayed. The sender's indicator may be side by side with or the carrier's indicator or alone. So, for example, if an employee of a company sent an e-mail through the USPS there might be two icons side by side in the recipient's mailbox, one being the USPS icon and the other being the company icon. The mailbox may be a user's inbox, sent item box, trash box, or any electronic listing of the user's e-mail messages.

Electronic Transmission Identification

Figure 8:
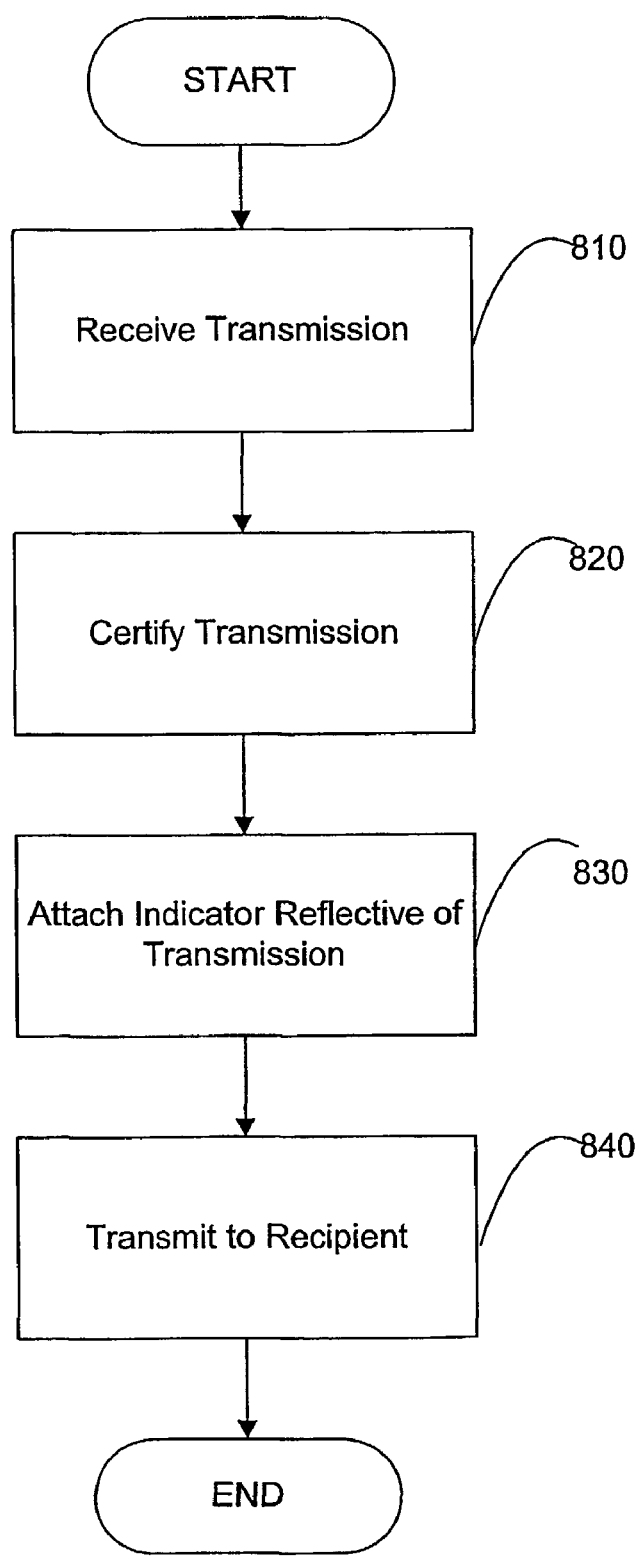
FIG. 8 a flow diagram of one embodiment of electronic transmission identification.

In accordance with the invention there may be further provided the value-added processing service of electronic transmission identification. FIG. 8 illustrates one embodiment of electronic transmission identification. First the mediation site accepts an electronic transmission from the user to the intended recipient (step 810). Then the mediation site adds certification to the electronic transmission (step 820). Certification may be an electronic postmark, an indication of the authenticity of the sender, an indication of a receipt, or any other type of association bearing on the identification of the transmission. One example of a postmark is described in U.S. patent application Ser. No. 09/675,677, filed Sep. 29, 2000, entitled "Systems and Methods for Authenticating an Electronic Message," which is incorporated by reference in its entirety herein. The certification may be an identification service provided to the sender for a fee. The fee paid by the sender may correspond to the amount of information in the certificate. The certification may indicate that the e-mail message may be virus free or may have no offensive content. An indicator reflective of the certificate may be attached to the transmission (step 830). The transmission may be then sent to the recipient (step 840). The indicator may then be displayed in association with the electronic transmission in the recipient's mailbox. This may take place in the mailbox of a recipient in a manner similar to that described with respect to FIG. 5.

Another type of electronic transmission identification may involve the recipient interacting with the mediation site. The recipient may designate, at the mediation site, users from whom they wish to receive messages. The recipient may place a different value on different users and this may be reflected in the type of indicator or certificate associated with the message. In this embodiment, the criteria of the recipient may be the basis by which an indicator is associated with a message.

Guaranteed Delivery

Figure 9:
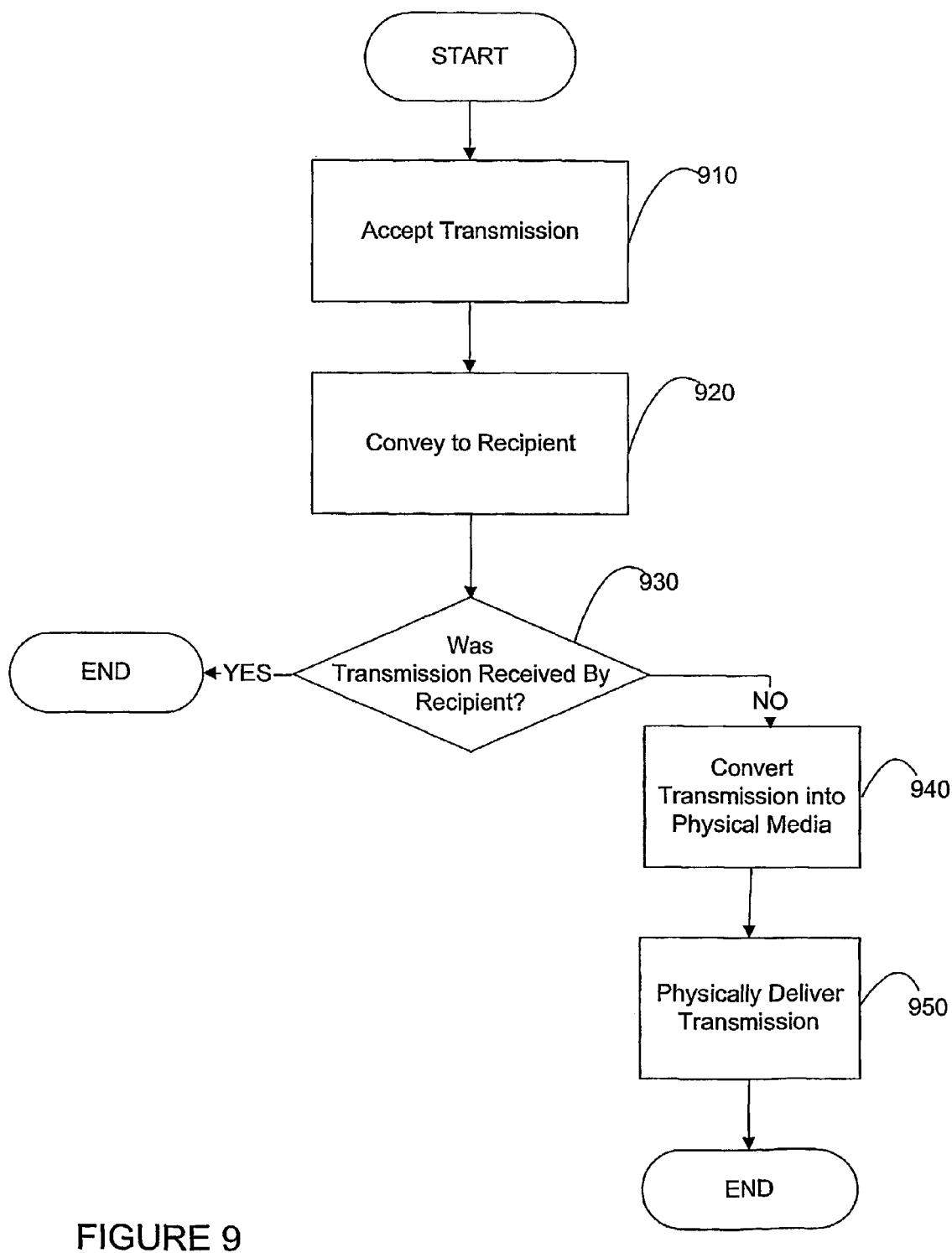
FIG. 9 a flow diagram of one embodiment of guaranteed delivery.

In accordance with the invention there may be further provided the value-added processing service of guaranteed delivery. FIG. 9 illustrates one example of guaranteed delivery. The meditation site receives an electronic transmission from the user to the intended recipient (step 910). The mediation site conveys the electronic transmission to the intended recipient (step 920). The medication site then attempts to verify receipt of the electronic transmission by the intended recipient (step 930). If the receipt is not confirmed, the electronic transmission may be converted to physical media (step 940). The physical media may them be physically conveyed to the intended recipient (step 950). The physical media may be paper mail, and the method of physical conveyance may be through the US Postal Service.

In an alternate embodiment, guaranteed delivery may include a continuous resending of a message until it is received by the intended recipient. For example, if an e-mail program is down at any one particular time, a message might be retained by the mediator and repeatedly resent until the message is delivered electronically. If at some point (either after a predetermined time, number of repetitions, or affirmative indication of error) there is an indication that the e-mail is unlikely to be received in an electronic form, an attempt may be made to send the message in physical form, such as on paper through the physical mail. The electronic message may be converted to paper, placed in an envelope (or folded like a telegraph), metered with postage, and physically sent to a specific physical address.

Address Verification

Figure 10:
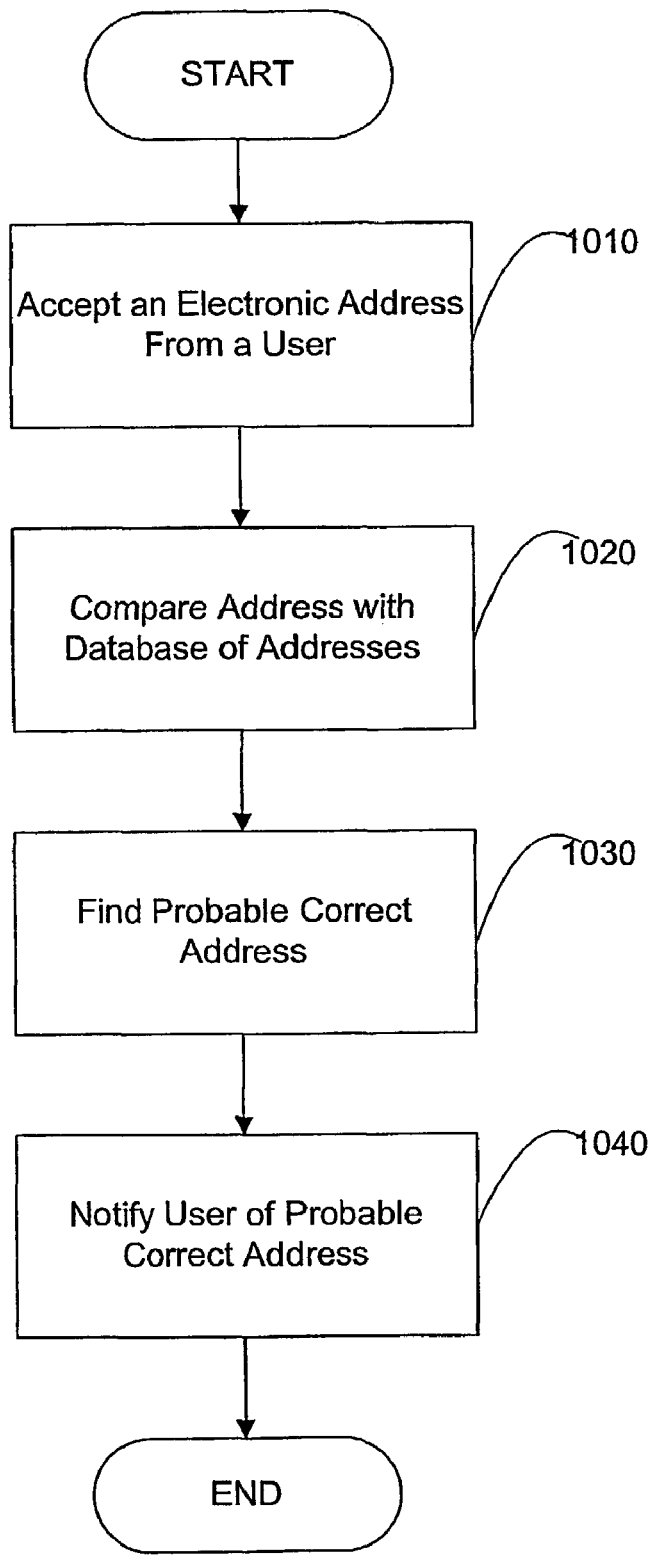
FIG. 10 a flow diagram of one embodiment of address verification.

In accordance with the invention there may be further provided the value-added processing service of address verification. FIG. 10 illustrates one example of address verification. The mediation site receives an electronic address to be verified (step 1010). The mediation site compares the address to a database of correct addresses (step 1020). The database of correct addresses may be the Direct Network Services (DNS). DNS is a compilation of all valid e-mail addresses. The mediation site identifies a probable correct address, if there is no match in the database for the address received (step 1030). The mediation site may employ an algorithm that may identify a correct address for an incorrect one, or provide a list of possible correct addresses, by identifying the address and/or some other indicia of identity. The mediation site informs the user of the probable correct address (step 1040).

Address Correction

Figure 11:
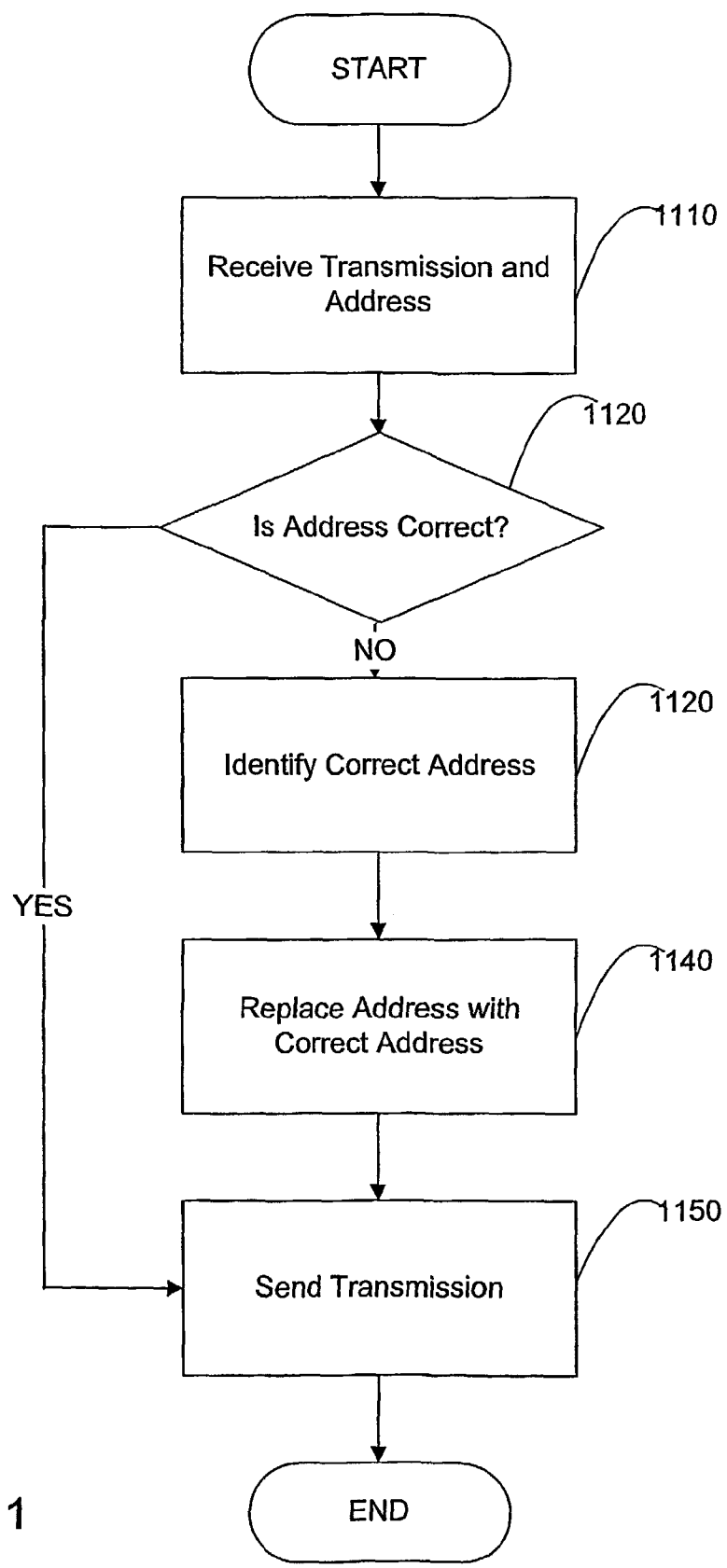
FIG. 11 a flow diagram of one embodiment of address correction

In accordance with the invention there may be further provided the value-added processing service of address correction. FIG. 11 illustrates one example of address correction. A message and an address are received (step 1110). The mediation site verifies that the address is correct (step 1120). If the address is correct the message is sent (step 1150). If the address is not correct, the mediation site identifies a correct address (step 1130). The original address may be replaced by the correct address (step 1140). Then, the message may be sent (step 1150). In an alternate embodiment, the mediation site may inform the user of the incorrect address and suggest a correct address before sending the message.

Archiving

Figure 12:
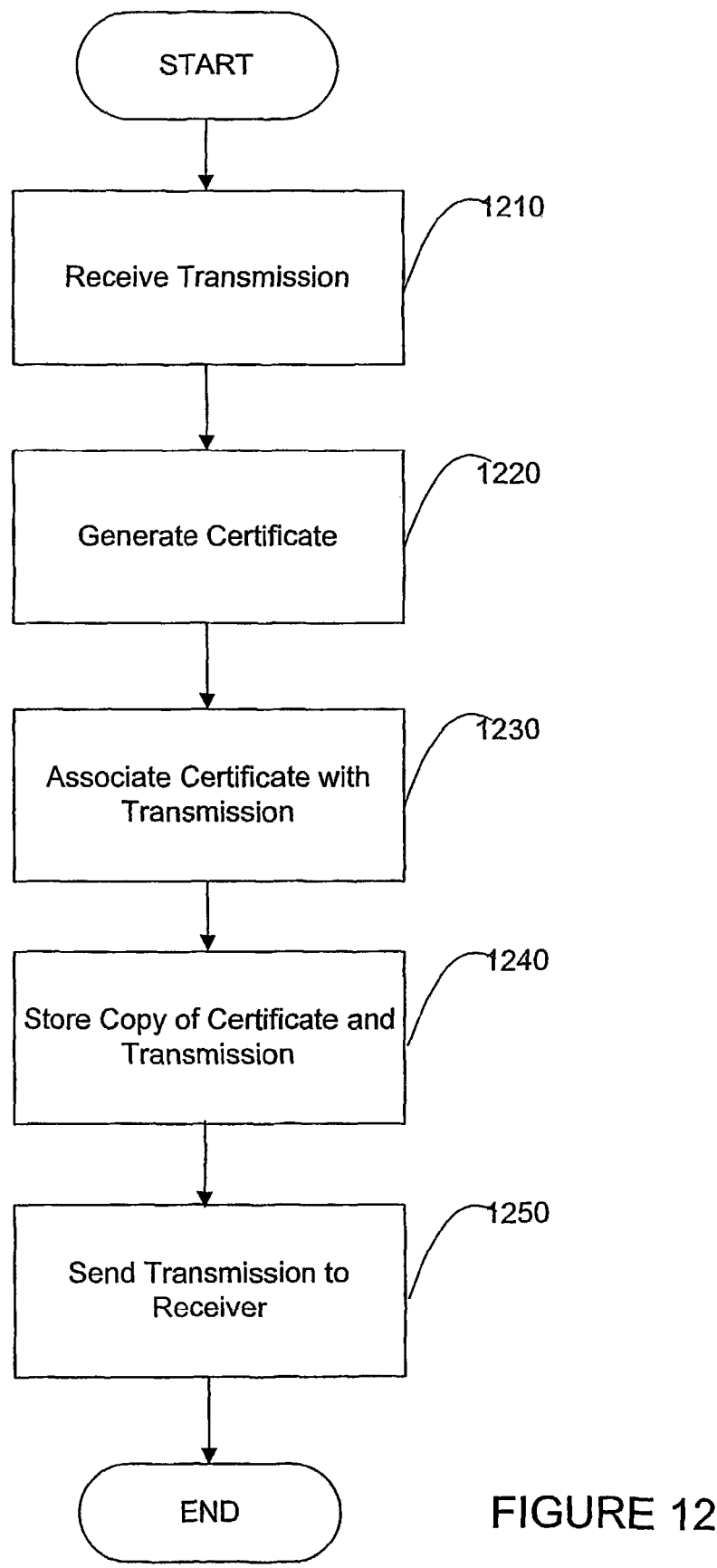
FIG. 12 a flow diagram of one embodiment of archiving.

In accordance with the invention there may be further provided the value-added processing service of archiving. FIG. 12 illustrates one example of archiving. The mediation site receives a message (step 1210). The mediation site generates a certificate for the message (step 1220). The mediation site associates the certificate with the transmission (step 1230). The certificate may be an electronic postmark. The mediation site stores the certificate and the transmission (step 1240). The storage may take place at the mediation site or at some third party site. The storage location should be independent of the sender and receiver. The storage may be electronic storage, or the message may be transformed into a physical media and that physical media may be stored. The sender may be charged for the service of storing, and this fee may be based on the type of storage and length of time for storage. Finally, the mediation site may send the message to the receiver (step 1250). Alternately, the mediation site may send the message and the certificate. Once stored, the sender may be able to obtain a copy of the stored message and certificate. The sender may be charged for the service of obtaining copies of the message. Other services may include a physical archiving service to provide secure storage of e-mail messages. The physical storage may involve printing the message onto paper and storing the message in a physical location.

Transmission Security

Figure 13:
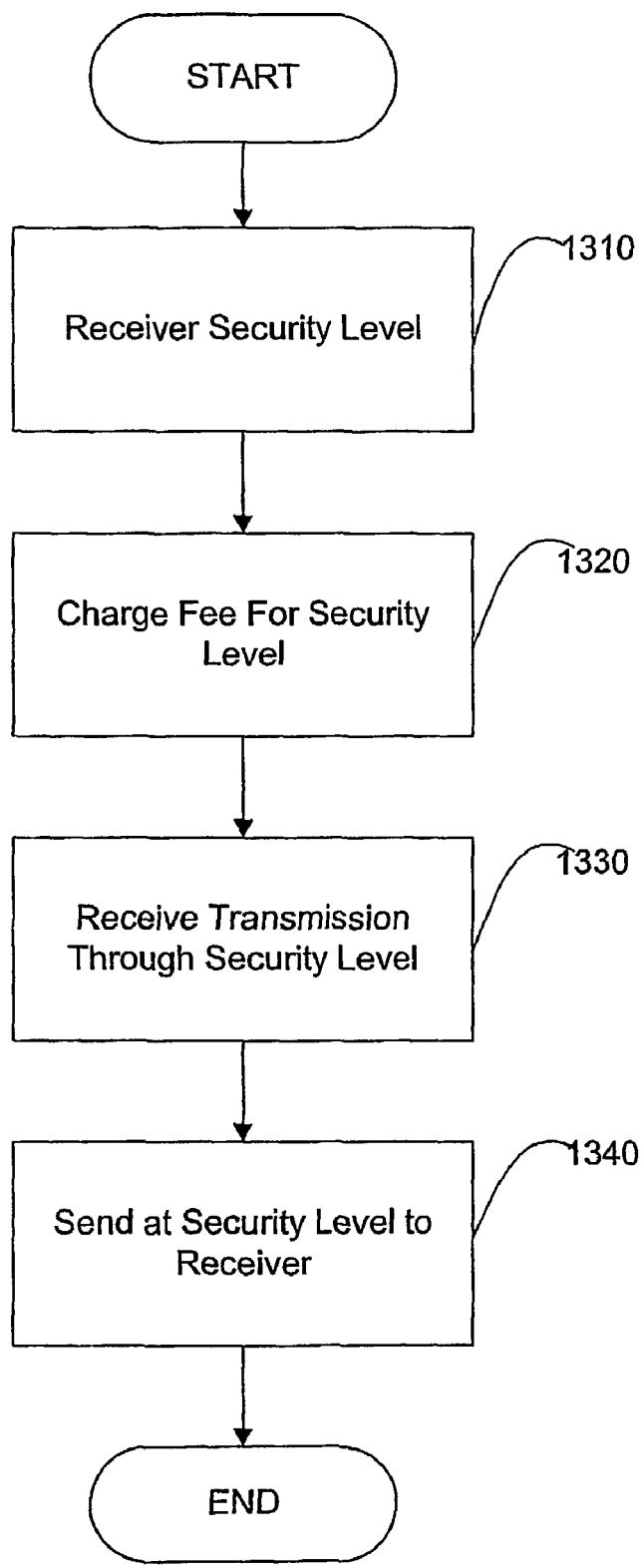
FIG. 13 a flow diagram of one embodiment of transmission security.

In accordance with the invention there may be further provided the value-added processing service of transmission security. FIG. 13 illustrates one example of transmission security. A security level choice maybe received (1310). The user may be charged for the use of the security level (step 1320). The mediation site receives the transmission through the security level (step 1330). The mediation site sends the transmission to the receiver through the security level (step 1340).

The various security options for one embodiment of the invention may include using digital certificates, NetPost.Certified, secured socket layers, or no security. Digital certificates may be included to provide end-to-end security, encrypting the document at the sender's side, ensuring that the document may be secure and not read by anybody else while it is being processed. NetPost.Certified is another process of securely transmitting the message. An example of a NetPost.Certified is described in PCT Application, filed Aug. 21, 2001, entitled "Systems And Method For Secure Data Structure," and listing Charles R. Chamberlain as inventor, which is incorporated by reference in its entirety herein. A Secured Socket Layer Level 3 creates a secure tunnel or secure pathway between the sender and the mediation site, so that the two parties may communicate securely. Such a level of security is used for example, in the banking industry. If a customer is not worried about security at all, as may be the case with messages such as party invitations, the sender might choose to not use any security level in the sending of a message.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An electronic transmission method, comprising:
communicating electronically, by a user that is an electronic system, a message to a recipient that is an electronic system;
requiring authentication information from only the user;
conveying software to the user, wherein the software enables the user to selectively send electronic transmissions to the recipient via a computer system acting as a mediation site;
associating with the mediation site at least one value-added processing service chosen from the group consisting of carrier indication, sender indication, transmission identification, address verification, address correction, and archiving; and
billing the user for service rendered through the mediation site for the at least one value-added processing service.

2. The method of claim 1, wherein the value-added processing service of carrier indication includes:
accepting, at the mediation site, an electronic transmission from the user to the recipient;
causing an indicator reflective of the mediation site to be associated with the electronic transmission; and
conveying the electronic transmission to the recipient via the mediation site in a manner causing, after receipt by the recipient, the indicator to be displayed associated with the electronic transmission.

3. The method of claim 1, wherein the value-added processing service of sender indication includes:
accepting, at mediation site, an electronic transmission from the user to the recipient; and
conveying the electronic transmission from the mediation site to the recipient along with coding for an indicator reflective of the sender's identity, wherein the electronic transmission and the indicator are conveyed in a manner to cause a monitor of the recipient to display the indicator associated with electronic transmission identification information.

4. The method of claim 1, wherein the value-added processing service of electronic transmission identification includes:

accepting, at the mediation site, an electronic transmission from the user to the recipient;

adding to the electronic transmission a certification after receipt at the mediation site;

causing an indicator reflective of the certification to be associated with the electronic transmission; and conveying the electronic transmission and the certification from the mediation site to the recipient in a manner causing, after receipt by the recipient, the indicator to be displayed in association with the electronic transmission.

5. The method of claim 1, wherein the value-added processing service of guaranteed delivery includes:

accepting, at the mediation site, an electronic transmission from the user to the recipient;

conveying the electronic transmission, from the mediation site to the recipient;

attempting to verify receipt of the electronic transmission by the recipient;

converting the electronic transmission to physical media if electronic receipt of the electronic transmission is not verified; and physically conveying the electronic transmission on the physical media to the recipient.

6. The method of claim 5 further including, prior to converting, electronically reconveying the electronic transmission to the recipient if receipt verification is not accomplished.

7. The method of claim 1, wherein the value-added processing service of address verification includes:

accepting, at the mediation site from a user at least one electronic address to be verified;

comparing the at least one electronic address with electronic addresses listed in a database of actual electronic addresses;

identifying, when said at least one address does not match an entry in the database, a probable correct address; and notifying the user of the incorrect address and the probable correct address.

8. The method of claim 1, wherein the value-added processing service of address correction includes:

accepting, at the mediation site, from a user an electronic transmission along with a listed electronic address of the recipient;

verifying accuracy of the listed electronic address, by comparing the listed electronic address with a database of actual electronic addresses;

identifying a correct electronic address when the listed address does not match an address in the electronic database;

replacing the listed address with the correct electronic address; and conveying the electronic transmission to the correct electronic address.

9. The method of claim 1, wherein the value-added processing service of archiving includes:

accepting, at the mediation site, an electronic transmission from the user to the recipient;

associating, at the mediation site, a verification with the electronic transmission; storing, at a third party location other than a location of the user and the recipient, a copy of the electronic transmission and the verification; and conveying the electronic transmission to the recipient.

10. The method of claim 1, wherein the value-added processing service of transmission security includes:

offering the user a choice between a plurality of security levels;

accepting, at the mediation site, from a user an electronic transmission to the recipient along with a request for a chosen security level;

accepting a security level for conveying of the electronic transmission;

conveying, at the selected security level, the electronic transmission to the recipient; and charging the user a transaction fee as a function of the level of security chosen.

11. The method of claim 1, wherein the software is an e-mail program plug-in.

12. The method of claim 1, wherein billing is accomplished using one or more of prepaid, subscription or hierarchical billing structures.

13. The method of claim 1, wherein obtaining user identification information includes enabling the user to open an account at the mediation site and establishing an account record in conjunction therewith.

14. A method of identifying a mediator that is a computer system of an electronic transmission, the method comprising:

communicating, by a sender that is an electronic system, a message to a receiver that is an electronic system;

requiring registration information from only the sender;

accepting, at the mediator, an electronic transmission from the sender to the receiver;

causing an indicator reflective of the mediator to be associated with the electronic transmission; and conveying the electronic transmission to the receiver via the mediator in a manner causing, after receipt by the receiver, the indicator to be displayed associated with the electronic transmission.

15. The method of claim 14, wherein the indicator is conveyed by the mediator.

16. The method of claim 14, wherein the indicator is resident at the receiver's location, and during conveying, a code is forwarded with the electronic transmission, the code for causing the indicator to be displayed.

17. The method of claim 14, wherein the indicator is caused to be displayed adjacent to the electronic transmission identification information.

18. A method of identifying a source of an electronic transmission, the method comprising:

requiring registration information from only a sender that is an electronic system;

sending an electronic transmission from the sender to a receiver that is an electronic system; and sending coding to the receiver along with the electronic transmission, wherein the coding is for an indicator reflective of the sender's identity, and wherein the electronic transmission and the indicator are sent in a manner to cause a monitor of the receiver to display the indicator associated with electronic transmission identification information.

19. The method of claim 18, wherein the electronic transmission identification information is displayed on an electronic transmission identification information list.

20. The method of claim 19 wherein the electronic transmission identification list is a listing in a mailbox of transmissions received by the receiver and wherein the indicator is an icon displayed in the mailbox adjacent to the listing of the electronic transmission.

21. The method of claim 18, wherein the indicator is caused to be displayed adjacent to the electronic transmission identification information.

22. The method of claim 18, further comprising sending the electronic transmission to the receiver via a mediator, and sending, with the electronic transmission, an indicator reflective of the mediator's identity, the conveying occurring in a manner causing the indicator reflecting the mediator's identity to be displayed in addition to the indicator reflecting the sender's identity.

23. The method of claim 18, wherein the indicator of the sender's identity and the indicator of the mediator's identity are simultaneously displayed in the receiver's electronic transmission identification information list.

24. A method of sending an electronic transmission, the method comprising:
   requiring registration information from only a sender that is an electronic system;
   receiving, by a mediator that is a computer system, an electronic transmission from the sender to a receiver that is an electronic system;
   adding to the electronic transmission a certification after receipt at the mediation site;
   causing an indicator reflective of the certification to be associated with the electronic transmission; and
   sending the electronic transmission and the certification from the mediator to the receiver in a manner causing, after receipt by the receiver, the indicator to be displayed in display associated with the electronic transmission.

25. The method of claim 24 wherein the display is an electronic transmission identification listing in a mailbox of transmissions received by the receiver and wherein the indicator is an icon displayed in the mailbox adjacent to the listing of the electronic transmission.

26. The method of claim 24, wherein the indicator is caused to be displayed adjacent to electronic transmission identification information.

27. The method of claim 24, wherein the certification is an identification service provided to the sender for a fee.

28. The method of claim 27, wherein the fee paid by the sender corresponds to the amount, of information provided in the certificate.

29. The method of 27, wherein the identification service identifies the electronic transmission as virus free.

30. The method of 27, wherein the identification service identifies the electronic transmission as having non-offensive content.

31. A method of sending an electronic transmission, the method comprising:
   requiring authentication information from only a sender that is an electronic system;
   receiving, by a mediator that is a computer system, an electronic transmission from the sender for a receiver that is an electronic system;
   associating an indicator with the electronic transmission, wherein the indicator is based on a criteria defined by the receiver; and
   sending the electronic transmission from the mediator to the receiver in a manner causing, after receipt by the receiver, the indicator to be displayed is a display associated with the electronic transmission.

32. The method of claim 31 wherein the display is a electronic transmission identification listing in a mailbox of transmissions received by the receiver and wherein the indicator is an icon displayed in the mailbox adjacent to the listing of the electronic transmission.

33. The method of claim 31, wherein the indicator is caused to be displayed adjacent to electronic transmission identification information.

34. The method of claim 31, wherein the criteria is an indication of the value the receiver places on the electronic transmission.

35. The method of claim 31, wherein the fee paid by the receiver corresponds to the amount of information provided in the indicator.

36. A method of securely conveying an electronic transmission, comprising:
   requiring registration information from only a sender that is an electronic system;
   enabling the sender to select a level of security for the sending of an electronic transmission to a receiver that is an electronic system;
   charging the sender a transaction fee as a function of the level of security chosen;
   enabling the sender to securely send the electronic transmission to a computer system acting as a mediator; and
   conveying, at the selected security level, the electronic transmission from the mediator to the receiver.

37. The method of claim 36, wherein the levels of security includes signing the electronic transmission with a digital certificate.

38. The method of claim 36, wherein the levels of security includes hashing the electronic transmission and signing the hashed electronic transmission.

39. The method of claim 36, wherein the levels of security includes using a Secure Socket Layer.

40. A method of archiving electronic transmissions, the method comprising:
   requiring registration information from only a sender that is an electronic system;
   enabling the sender to send an electronic transmission to a computer system acting as a mediator for conveying to a receiver that is an electronic system;
   generating by the mediator certification of the electronic transmission;
   associating the certification with the electronic transaction;
   storing by the mediator a copy of the electronic transmission and the certification; and
   sending the electronic transmission to the receiver.

41. The method of claim 40, wherein the certification is a postmark.

42. The method of claim 40, wherein the certification is transmitted to the sender.

43. The method of claim 40, further comprising charging the sender a fee for storing.

44. The method of claim 40, further comprising enabling the sender to obtain, subsequent to sending the electronic transmission, a copy of the stored electronic transmission and the stored certificate.

45. The method of claim 44, further comprising charging the sender for obtaining one or more copies.

46. The method of claim 40, wherein the storing step further comprises using a physical media to store the electronic transmission and certificate.

47. A method of providing guaranteed electronic transmission delivery, the method comprising:
   requiring registration information from only a sender that is an electronic system;
   enabling the sender to electronically send to a computer system acting as a mediator an electronic transmission intended for a receiver that is an electronic system;
   sending the electronic transmission, from the mediator to the receiver;
   attempting to verify receipt of the electronic transmission by the receiver; converting the electronic transmission to physical media if electronic receipt of the electronic transmission is not verified; and
   physically conveying the electronic transmission on the physical media to the receiver.

48. The method of claim 47 further including, prior to converting, electronically reconveying the electronic transmission to the receiver if receipt verification is not accomplished.

49. The method of claim 47, wherein the physical media is paper mail.

50. A method of sending an electronic transmission, the method comprising:
- requiring registration information from only a sender that is an electronic system;
- enabling the sender to convey the electronic transmission to a computer system acting as a mediator along with a listed electronic address of a receiver that is an electronic system of the electronic transmission;
- verifying by the mediator accuracy of the listed electronic address by comparing the listed electronic address with a database of actual electronic addresses;
- identifying a correct electronic address when the listed address does not match an address in the electronic database;
- replacing the listed address with the correct electronic address; and
- sending the electronic transmission to the correct electronic address.

51. The method of claim 50 further comprising giving the sender the option of choosing a new address from a list of possible addresses.

52. The method of claim 50, wherein identifying a correct electronic address further comprises recognizing common errors.

53. The method of claim 50 wherein the database maps a physical address to the electronic address.

54. The method of claim 50 wherein the database maps a name to the electronic address.

55. The method of claim 50 wherein the database is the Direct Network Services compilation of all valid e-mail addresses.

56. A method of verifying electronic addresses, the method comprising:
- requiring registration information from only a sender that is an electronic system;
- accepting, at a computer system acting as a mediation site, from the sender at least one electronic address to be verified;
- comparing the at least one electronic address with electronic addresses listed in a database of actual electronic addresses;
- identifying, when said at least one address does not match an entry in the database, a probable correct address; and
- notifying the sender of the incorrect address and the probable correct address.

57. The method of claim 56, further comprising giving the sender the option of choosing a new address from a list of possible addresses.

58. The method of claim 56 wherein the identifying step further comprises recognizing common errors.

59. The method of claim 56 wherein the database maps a physical address to the electronic address.

60. The method of claim 56 wherein the database maps a name to the electronic address.

61. The method of claim 56 wherein the database is the Direct Network Services compilation of all valid e-mail addresses.

62. An electronic e-mail system, comprising:
- a mediation site enabling a user to transmit electronic transmissions to intended recipients;
- a registration module to register only the user, enabling the user to electronically open an account and register for use of the mediation site by providing identifying user and payment information;
- a module to transmitt to the user plug-in software compatible with a user's e-mail program and permitting the user to selectively transmit electronic transmissions to the intended recipients via the mediation site;
- at least one value-added processing module, associated with the mediation site, chosen from the group consisting of virus-free verification, time and date verification, transmission archiving, address authentication, address correction, content screening, mail opened verification and guaranteed delivery; and
- a module to bill the user for services rendered through the mediation site.

63. The system of claim 62 wherein the mediation site includes a server.

64. The system of claim 62 wherein the registration module includes software for generating an electronic application form.

65. The system of claim 62 wherein the module to transmitt the plug-in software provides the user an option of receiving the software through electronic or physical transmission.

66. The system of claim 62 wherein the at least one value-added module transmits to the sender associated information regarding the electronic transmission.

67. The system of claim 62 wherein the billing module charges a user's account based, at least in part, on volume of messages transmitted.

68. The system of claim 67 wherein the billing module charges the user's account based, at least in part, on the selected value-added service.

69. The system of claim 62 wherein the system allows the user to selectively choose one or more value-added processes.

* * * * *